(12) United States Patent
Jouppi et al.

(10) Patent No.: US 11,526,995 B2
(45) Date of Patent: Dec. 13, 2022

(54) ROBUST USE OF SEMANTIC SEGMENTATION FOR DEPTH AND DISPARITY ESTIMATION

(71) Applicant: Apple Inc., Cupertino, CA (US)

(72) Inventors: Mark N. Jouppi, Palo Alto, CA (US); Alexander Lindskog, San Jose, CA (US); Michael W. Tao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 16/566,082

(22) Filed: Sep. 10, 2019

(65) Prior Publication Data
US 2020/0082541 A1 Mar. 12, 2020

Related U.S. Application Data

(60) Provisional application No. 62/729,845, filed on Sep. 11, 2018.

(51) Int. Cl.
*G06T 7/194* (2017.01)
*G06T 5/00* (2006.01)
(Continued)

(52) U.S. Cl.
CPC .............. *G06T 7/194* (2017.01); *G06T 5/002* (2013.01); *G06T 5/20* (2013.01); *H04N 13/128* (2018.05);
(Continued)

(58) Field of Classification Search
USPC .................................. 382/154, 173; 345/419
See application file for complete search history.

(56) References Cited

U.S. PATENT DOCUMENTS 8,411,934 B2 * 4/2013 Zhang ..................... G06T 5/002
382/154
8,472,746 B2 * 6/2013 Wei ........................ G06V 10/30
382/264
(Continued)

OTHER PUBLICATIONS

Song et al, "Enhanced spatial-range mean shift color image segmentation by using convergence frequency and position", 14th European Signal Processing Conference (EUSIPCO2006) pp. 1-5 (Year: 2006).*

(Continued)

*Primary Examiner* — Kathleen Y Dulaney
(74) *Attorney, Agent, or Firm* — Blank Rome LLP

(57) ABSTRACT

This disclosure relates to techniques for generating robust depth estimations for captured images using semantic segmentation. Semantic segmentation may be defined as a process of creating a mask over an image, wherein pixels are segmented into a predefined set of semantic classes. Such segmentations may be binary (e.g., a 'person pixel' or a 'non-person pixel') or multi-class (e.g., a pixel may be labelled as: 'person,' 'dog,' 'cat,' etc.). As semantic segmentation techniques grow in accuracy and adoption, it is becoming increasingly important to develop methods of utilizing such segmentations and developing flexible techniques for integrating segmentation information into existing computer vision applications, such as depth and/or disparity estimation, to yield improved results in a wide range of image capture scenarios. In some embodiments, an optimization framework may be employed to optimize a camera device's initial scene depth/disparity estimates that employs both semantic segmentation and color regularization in a robust fashion.

27 Claims, 7 Drawing Sheets

(51) Int. Cl.
    *G06T 5/20*     (2006.01)
    *H04N 13/128*     (2018.01)
    *H04N 13/156*     (2018.01)
    *H04N 13/271*     (2018.01)
    *H04N 13/00*     (2018.01)
    *G06T 7/50*     (2017.01)

(52) U.S. Cl.
    CPC ......... *H04N 13/156* (2018.05); *H04N 13/271* (2018.05); *G06T 7/50* (2017.01); *H04N 2013/0077* (2013.01); *H04N 2013/0081* (2013.01); *H04N 2013/0092* (2013.01)

(56) References Cited

U.S. PATENT DOCUMENTS

| | | | | |
|---|---|---|---|---|
| 8,565,513 | B2* | 10/2013 | Shao | G06T 7/593 382/154 |
| 8,823,775 | B2 | 9/2014 | Xu | |
| 9,113,043 | B1* | 8/2015 | Kim | G09G 5/00 |
| 9,129,379 | B2 | 9/2015 | Sorgi | |
| 9,165,401 | B1* | 10/2015 | Kim | H04N 13/275 |
| 9,414,048 | B2* | 8/2016 | Karsch | H04N 13/261 |
| 9,443,316 | B1* | 9/2016 | Takeda | G06K 9/6253 |
| 10,897,558 | B1* | 1/2021 | Sun | G06T 5/002 |
| 2003/0174889 | A1* | 9/2003 | Comaniciu | G06T 7/11 382/173 |
| 2005/0286758 | A1* | 12/2005 | Zitnick, III | G06T 7/55 382/154 |
| 2011/0032341 | A1* | 2/2011 | Ignatov | H04N 13/144 348/42 |
| 2011/0188773 | A1* | 8/2011 | Wei | G06V 10/30 382/260 |
| 2011/0188780 | A1* | 8/2011 | Wang | H04N 13/261 382/293 |
| 2012/0183202 | A1* | 7/2012 | Wei | H04N 13/261 382/154 |
| 2012/0275701 | A1* | 11/2012 | Park | G06V 10/462 382/173 |
| 2013/0156294 | A1* | 6/2013 | Wei | G06T 7/50 382/154 |
| 2013/0176300 | A1* | 7/2013 | Robert | H04N 13/128 345/419 |
| 2013/0236089 | A1* | 9/2013 | Litvak | G06V 20/64 382/154 |
| 2014/0369584 | A1* | 12/2014 | Fan | G06V 10/20 382/131 |
| 2015/0248769 | A1* | 9/2015 | Ukil | G06T 7/50 382/154 |
| 2015/0304630 | A1* | 10/2015 | Wu | H04N 13/261 348/44 |
| 2016/0063715 | A1* | 3/2016 | Wan | G06T 3/40 382/195 |
| 2016/0094829 | A1* | 3/2016 | Georgiev | H04N 19/46 348/43 |
| 2016/0134874 | A1 | 5/2016 | Konieczny | |
| 2016/0180195 | A1* | 6/2016 | Martinson | G06N 7/005 382/103 |
| 2017/0061701 | A1* | 3/2017 | Mittal | G06T 5/002 |
| 2017/0124717 | A1* | 5/2017 | Baruch | G06T 7/12 |
| 2017/0223334 | A1* | 8/2017 | Nobayashi | G06T 7/571 |
| 2018/0293745 | A1* | 10/2018 | Ha | G06T 5/002 |
| 2019/0043203 | A1* | 2/2019 | Fleishman | H04N 5/247 |
| 2019/0362511 | A1* | 11/2019 | Jouppi | G06T 5/50 |
| 2020/0082198 | A1* | 3/2020 | Yao | G06V 10/764 |
| 2020/0082535 | A1* | 3/2020 | Lindskog | G06V 40/10 |
| 2021/0358212 | A1* | 11/2021 | Vesdapunt | G06T 19/20 |

OTHER PUBLICATIONS

Doulamis, et al., "Unsupervised Semantic Object Segmentation of Stereoscopic Video Sequences," International Conference on Information Intelligence and Systems, Feb. 1999.

Seguin, Guillaume, "Person analysis in stereoscopic movies," Computer Vision and Pattern Recognition, PSL Research University, 2016.

* cited by examiner

ROBUST USE OF SEMANTIC SEGMENTATION FOR DEPTH AND DISPARITY ESTIMATION

TECHNICAL FIELD

This disclosure relates generally to the field of digital imaging. More particularly, but not by way of limitation, it relates to techniques for performing robust depth and/or disparity estimation in digital images.

BACKGROUND

The advent of mobile, multifunction devices, such as smartphones and tablet devices, has resulted in a desire for small form factor cameras capable of generating high levels of image quality in real time or near-real time for integration into such mobile, multifunction devices. Increasingly, as users rely on these multifunction devices as their primary cameras for day-to-day use, users demand features that they have become accustomed to using in dedicated-purpose camera devices.

Some such features, e.g., "portrait-style" photography modes, rely on the use of estimated depth and/or disparity maps for the captured images, i.e., in order to create the effect of a shallower depth of field than would normally be seen in images naturally captured by a device's camera system. (The resulting portrait-style images having the appearance of a shallow depth of field are also referred to herein as "SDOF" images or "synthetic SDOF" images.) For example, in such portrait-style, synthetic SDOF images, a greater amount of blurring may be applied to objects that are estimated to be farther from the focal plane in the captured scene (e.g., background objects), whereas objects that are in the focal plane, such as a human subject in the foreground of the captured scene, may remain relatively sharper, thus pleasantly emphasizing the appearance of the human subject to a viewer of the image. However, certain scene capture conditions (e.g., where foreground and background objects may contain similar colors, and/or where objects at a single depth plane in the scene contain multiple colors and textures) may present particular challenges to typical color image-based regularization techniques for depth and/or disparity estimation.

Semantic segmentation is becoming increasingly popular in its usage in products involving image processing and computer vision. Semantic segmentation may be defined as a process of creating a mask, e.g., a per-pixel mask over an image, wherein pixels are assigned (or "segmented") into a predefined set of semantic classes. Such segmentations may be binary (e.g., a given pixel may be classified as either a 'person pixel' or a 'non-person pixel'), or segmentations may also be multi-class segmentations (e.g., a given pixel may be labelled as: 'person,' 'dog,' 'cat,' or 'other'). In recent years, the most accurate semantic segmentations have been achieved using convolutional neural networks (CNNs). As semantic segmentation techniques grow in accuracy and adoption, it is becoming increasingly important to develop robust methods of utilizing such segmentations and developing flexible techniques for integrating segmentation information into existing computer vision applications, such as depth and/or disparity estimation, to yield improved results in a wide range of image capture scenarios.

SUMMARY

Electronic devices, computer readable storage media, and related methods are disclosed herein that are configured to generate depth and/or disparity estimates for captured images. In particular, such estimates may rely on a robust usage of semantic segmentation information associated with the captured image, in combination with color information associated with the captured image.

Throughout the discussion herein, various aspects of disparity and depth will be discussed with regard to captured images. As used herein, disparity refers to the amount of shift observed between corresponding parts of images captured from different perspectives, e.g., two cameras separated by a distance. The amount of shift that is needed to cause the corresponding parts of the images to overlap is the disparity. The disparity at which objects in the image best match may be used to calculate the depth of the objects in the scene, i.e., the actual distance that the objects are away from the capturing camera(s). Disparity information may be converted into depth information according to any desired method. For example, in some cases, depth is calculated generally as being proportional to the inverse of the disparity estimate.

In some disparity estimation embodiments described herein, a joint optimization framework may be employed that utilizes a camera device's initial scene disparity information estimates (e.g., as obtained by stereo pairs of images, focus pixels (i.e., pixels used for phase detection autofocus), active disparity sensing, or other methods of disparity estimation) and incorporates both a data term and regularization term. The data term may also be referred to herein as a "matching" or "cost" term, and the regularization term may be used to encode a constraint to the optimization solution, e.g., a smoothness constraint, as in the case of some disparity maps. According to some embodiments, the optimization framework may employ an iterative approach to solving for the values of the image's disparity map, wherein, at each iteration, an additional step is taken to solve the joint optimization problem comprising the data term and the regularization term. In some embodiments, one or more weights may be used to encode the importance of the data term in relation to the regularization term. This allows the optimization framework to be tuned to favor solutions that match the data more versus conforming more to the prior assumptions regarding the regularization term. According to some embodiments, the optimization may comprise a minimization operation.

Non-transitory program storage devices are also disclosed herein. Such program storage devices may comprise instructions stored thereon to cause one or more processors to: obtain a first image of a scene, the first image comprising a first plurality of pixels, the pixels having color values; obtain first depth or disparity information comprising a first plurality of values, wherein each value corresponds to a location in the scene; obtain at least one segmentation mask comprising a first plurality of segmentation values, wherein each segmentation value corresponds to a location in the scene; obtain at least one regularization term for at least one of the at least one segmentation masks; and perform an optimization operation to generate a first depth or disparity map, wherein the optimization operation is based, at least in part, on the first plurality of pixels, the first depth or disparity information, the at least one segmentation mask, and the at least one regularization term. In some embodiments, a blurred version of the first image (e.g., a synthetic SDOF image) may be generated based, at least in part, on the generated first depth or disparity map.

According to some embodiments, the instructions may further cause the one or more processors to obtain a confidence mask for one of the at least one obtained segmentation masks and then incorporate information from the confidence mask into the optimization operation. According to other embodiments, the instructions may further cause the one or more processors to obtain a maximum influence value for at least one segmentation class of one of the at least one segmentation masks and then incorporate the obtained maximum influence value into the optimization operation.

According to still other embodiments, at least two segmentation masks may be obtained for the first image, wherein each segmentation mask optionally has a corresponding confidence mask, regularization terms, and/or per-segmentation class maximum influence values. Such additional information from each obtained segmentation mask may also be incorporated into the optimization operation.

Various methods of generating robust depth and/or disparity estimations are also disclosed herein, in accordance with the program storage device embodiments enumerated above.

Various electronic devices are also disclosed herein, in accordance with the program storage device embodiments enumerated above. Such electronic devices may comprise a memory, one or more image capture devices, a display, a user interface, and one or more processors operatively coupled to the memory. Instructions may be stored in the memory, the instructions causing the one or more processors to perform techniques in accordance with the program storage device embodiments enumerated above.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
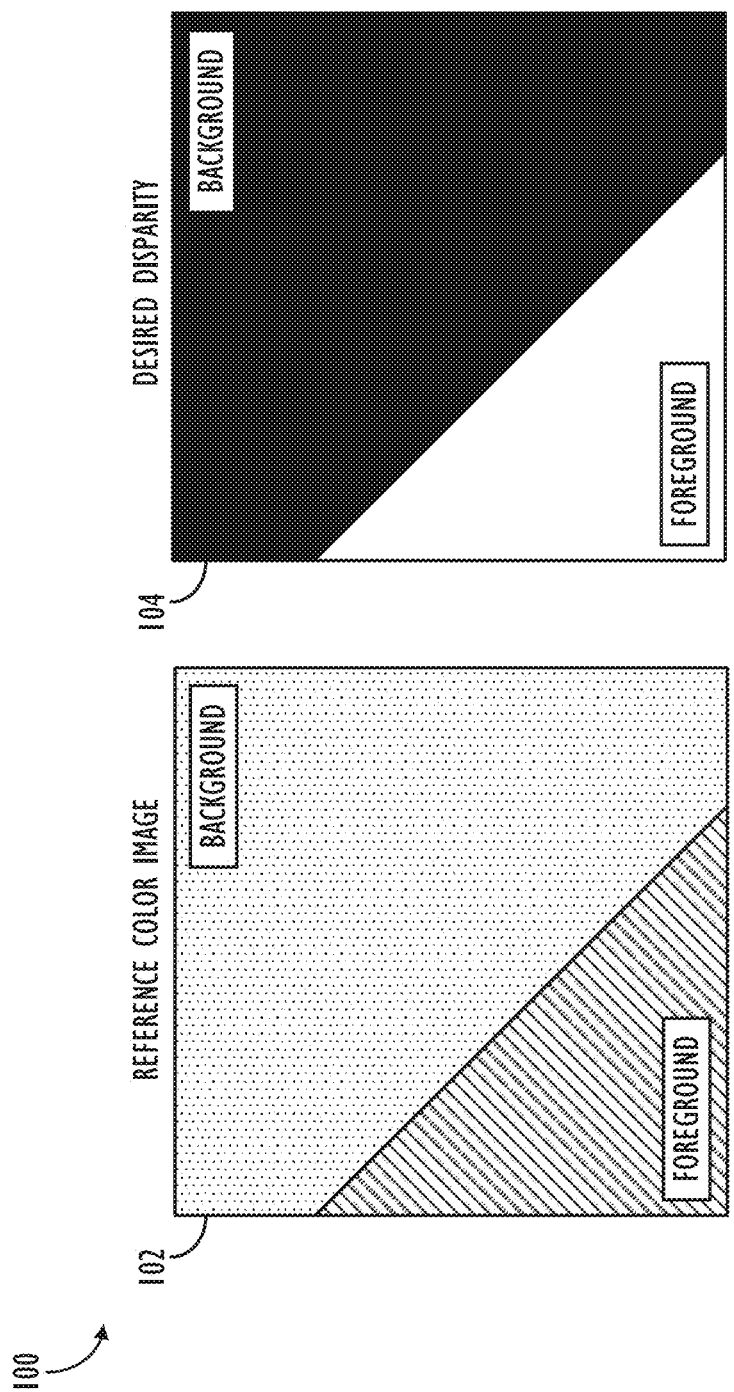
FIG. 1A is an example of a reference color image and the corresponding desired disparity map.

Turning now to FIG. 1A, an example 100 of a reference color image 102 and the corresponding desired disparity map 104 are shown. As illustrated in FIG. 1A, the foreground and background areas in reference color image 102 are different colors (as indicated by the different shading patterns in the respective regions). In the desired disparity map 104, the white pixels represent regions in the reference color image that should be marked as foreground pixels (and overlap exactly with the foreground-patterned region in the reference color image), and the black pixels represent regions in the reference color image that should be marked as background pixels (and overlap exactly with the background-patterned region in the reference color image).

In order to develop the desired disparity map, e.g., desired disparity map 104, a traditional stereo matching regularization method may be employed, as shown in Eqn. 1, below:

$$\Sigma_{(x,y) \in disparity\ map} |\nabla d(x,y)| \qquad \text{(Eqn. 1),}$$

wherein (x,y) represents the pixel coordinates for each pixel in the disparity map and $\nabla d(x,y)$ refers to the gradient of the disparity map at the (x,y) pixel coordinates of a given pixel. This type of traditional stereo matching regularization enforces the constraint/prior that the disparity map should be smooth. Put another way, the regularizer will penalize any large values in the gradient of the disparity map during the optimization operation. It is noted that, in some cases, the data source of the initial disparity information may be sparsely sampled over the entire image, e.g., in the case of a set of focus pixels distributed sparsely over an image sensor, but regularization ensures that areas of the captured scene that are lacking in initial disparity information (or contain erroneous information) will be filled in with estimated values, e.g., due to the smoothness constraint. It is further noted that, although the data term is referred to as comprising a disparity map in Eqn. 1 et seq., in some cases, the data source may instead comprise initial depth information, as opposed to disparity information, and that similar regularization techniques could be applied to such initial depth information.

Figure 1B:
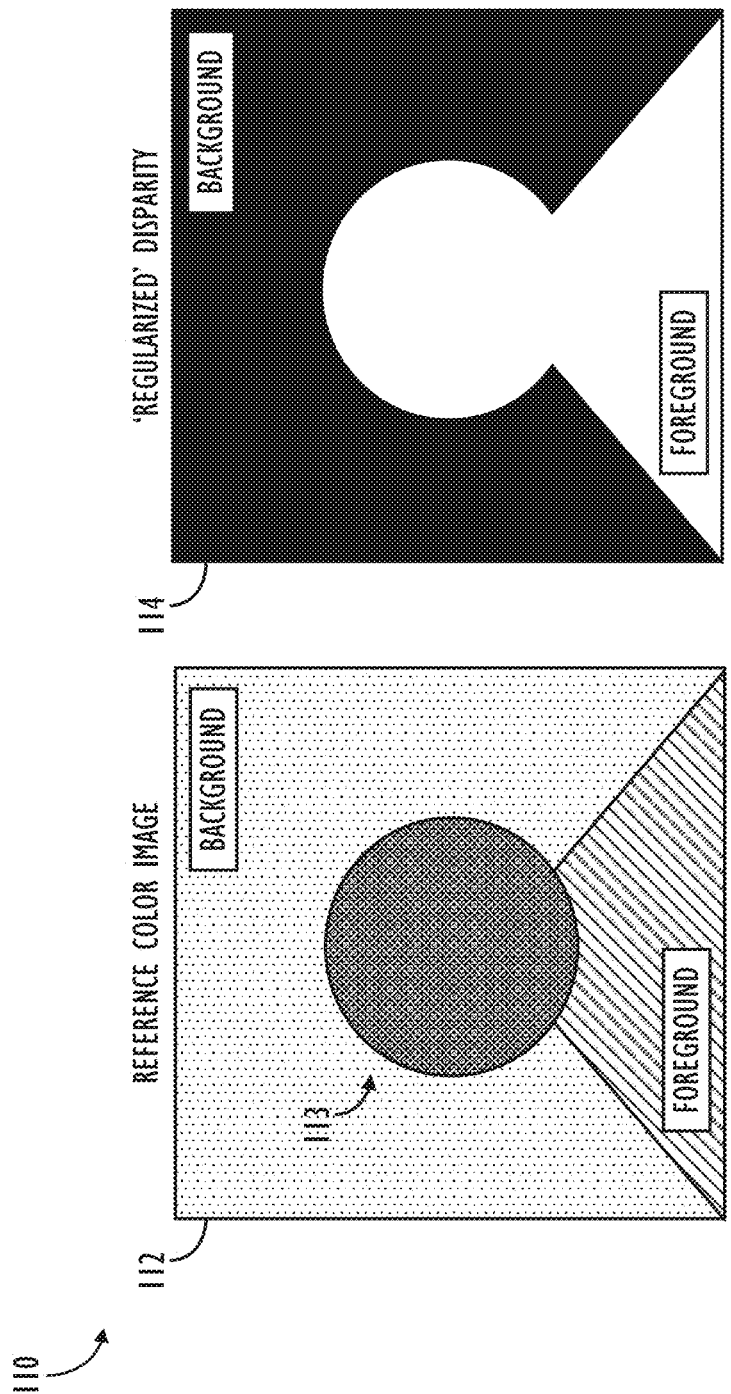
FIG. 1B is another example of a reference color image and the corresponding regularized disparity map.

Referring now to FIG. 1B, another example 110 of a reference color image 112 and the corresponding regularized disparity map 114 are shown. In the example of FIG. 1B, a color regularization scheme has been employed, using pixel color as a prior/constraint. The use of this constraint stems from the general notion that neighboring pixels with similar color values should also typically have similar disparity values. To respect color edges in the reference color image, the color edges may be used to determine where to smooth the disparity map, e.g., as shown in Eqn. 2, below:

$$\Sigma_{(x,y) \in disparity\ map} |e^{-|\nabla I_{RGB}(x,y)|} * \nabla d(x,y)| \qquad \text{(Eqn. 2),}$$

wherein (x,y) represents the pixel coordinates for each pixel that will be used in the disparity regularization operation, $\nabla d(x,y)$ refers to the gradient of the disparity map at the (x,y) pixel coordinates of a given pixel, and $\nabla I_{RGB}(x,y)$ refers to the gradient of the intensity values (e.g., the red/green/blue pixel values) in the reference color image at the (x,y) pixel coordinates of a given pixel.

Based on this notion that neighboring pixels with similar color values should also typically have similar depth and/or disparity values, depth and disparity algorithms have traditionally used color images as a regularization guide. As mentioned above, in an optimization framework, there are generally two terms or criteria to optimize, the data term (also called "matching" or "cost" term) and the regularization term. The data term encodes how well the solution explains the input data, e.g., a stereo disparity should have minimal residual between the reference image and warped non-reference image. The regularization term encodes a prior for the particular problem to constrain the set of solutions. One type of regularization term is to enforce some kind of smoothness assumption, e.g., that a disparity field should be a piecewise smooth surface. There will also typically be a weight(s) used to encode the importance of the data term in relation to the regularization term. For simplicity, in this disclosure, this weight will be referred to as "lambda." Using such a weight allows the algorithm to be tuned to favor solutions that match the data more, i.e., versus solutions that conform more to the prior assumptions regarding regularization.

For example, in a conventional disparity algorithm operating on stereo image pairs, the reference color image is typically used to encode smoothness constraints on the disparity field. Typically, such an algorithm would enforce the constraint that the disparity should be smooth in regions corresponding to uniform areas of the color image, whereas, in areas of the color image with textures or strong edges, the smoothness constraint on the disparity field would be relaxed. This encodes the assumption that depth edges should correspond to color edges. In the absence of more specialized priors, this may be a reasonable general assumption for many cases.

The strength of this approach is that it allows the algorithm to denoise and aggregate information spatially from the data term (e.g., disparity correspondences). If foreground objects have colors distinct from their backgrounds, such methods can yield clean edges and well-defined boundaries. If an object at the same depth is uniform in color, the depth can be successfully smoothed out within the object. However, this assumption is not always true; there are cases where foreground and background objects may contain similar colors, as well as cases where objects at a single depth plane contain multiple colors and textures.

Figure 1C:
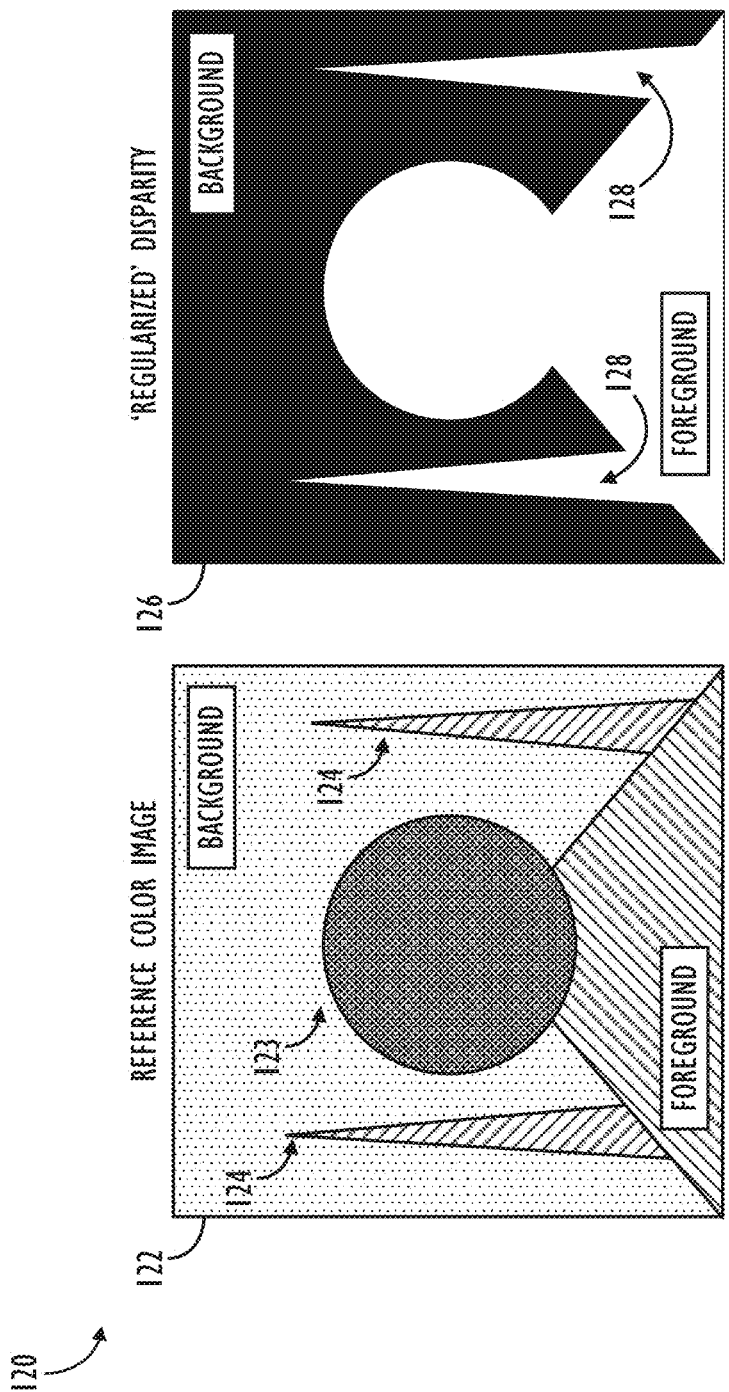
FIG. 1C is yet another example of a reference color image and the corresponding regularized disparity map.

FIG. 1C is an example of the former case. Specifically, in the example 120 of FIG. 1C, the reference color image 122 has background tree objects 124 that happen to be similar in color to the color of shirt being worn by human subject 123 (e.g., each may be predominantly dark green in color). Because of this similarity in color between bordering objects that are at different depths in the scene, it is possible that the regularized disparity map will exhibit bleeding 128 of the foreground across the depth boundary of the similarly-colored foreground and background objects (i.e., the background trees and the shirt of the human subject in FIG. 1C are both encoded as foreground pixels in regularized disparity map 126). In the case of objects at a single depth plane containing multiple colors and textures, it is possible that the regularized disparity map will exhibit noisy disparity estimates and/or the appearance of false depth edges because the areas could not be denoised or smoothed out with their neighbors due to having too dissimilar of colors within the object. This is one of the main weaknesses of traditional color image-based regularization techniques.

Semantic Segmentation

As previously described, semantic segmentation encodes a pixel-wise mapping to a given set of two or more classes, where the class describes the semantic object or category that the pixel belongs to. Depending on the specific segmentation scheme used, pixel classifications may be discrete (i.e., to encode given classes) or continuous (i.e., to encode the probability of a class). In addition to the segmentation mask itself, depending on the segmentation scheme used, a confidence map may also be generated. Such confidence maps encode the relative certainty of class predictions described by the segmentation mask.

The color image-based regularization techniques described above are commonly used because they offer a means of denoising and spatially aggregating information across depth and/or disparity maps where the assumption of depth edges corresponding to color edges holds true. In some instances, this may indeed be the most reasonable regularization scheme possible. However, in other cases, e.g., when expertly trained systems, such as segmentation networks, are available, which have learned from and distilled insights from large training datasets, such systems may be used to produce specialized semantic maps over the image to address some of the limitations of color image-based regularization and enforce different priors and assumptions, e.g., priors and assumptions that are specific to the semantic meaning of a given segmentation class.

In one particular usage of segmentation, the regularization scheme could simply assume that the different classes given by the segmentation are always of different depths. For example, given a binary person segmentation, one could assume the person pixels are foreground and the non-person pixels are background. This would create a blurred background with a sharp person, i.e., directly corresponding to the segmentation mask. If desired, one or more edge-aware filters (e.g., filters guided by color), such as a bilateral filter, could be used to refine the segmentation mask based on the color image's content. This has the drawback that, because there is no "signal" or "data term" to inform the depth, but only the output of the segmentation, there is no possibility of producing a look of 'continuous' depth in the image. This means that, e.g., in the case where a synthetic SDOF image is being generated from the estimated depth and/or disparity information, any objects other than the person that is segmented, even those objects that are in the same focus plane as the subject, will be blurred as if they were in the background. This approach can often produce unconvincing and unnatural-looking synthetic SDOF images.

Another approach may use semantic segmentation as a substitute for color regularization. That is, an approach that keeps the data term that is applicable for the given sensor modality (e.g., passive stereo pair, active sensing depth map, disparity from focus pixels) but that changes the conventional color image-based regularization to instead operate on a segmentation image. In this regime, instead of assuming that depth discontinuities correspond to color image edges, it is assumed that depth discontinuities correspond to segmentation boundaries.

The strength of this approach is that it allows the regularizer to smooth the interiors of segmented objects, even if there were edges or texture in the color image. Additionally, the smoothing at the edges of the segmentation image prevents the depth of the object from bleeding across its boundaries. In an ideal case with accurate segmentation, this effectively circumvents the problems encountered with color image based regularization, where the interior of objects consisting of different colors could not be smoothed, and foreground and background objects of different depths but similar colors had their depths improperly smoothed.

The disadvantage of this approach is that, if the semantic segmentation is used as a full replacement for the color image naively for the whole depth/disparity field, i.e., including those areas corresponding to non-segmented regions (e.g., if the segmentation mask is binary, and '1's=people, and '0's=not people, then non-segmented regions would be the '0's), this will result in loss of structure and detail in the non-segmented regions (e.g., for person segmentation, areas outside person lose any structure they would have had, and would be heavily smoothed). It is to be understood that a segmentation mask may have the same resolution as the reference color image or a different resolution, e.g., a higher or lower resolution than the reference color image, in which case a single value in a segmentation mask, corresponding to a particular location in the captured scene, may reflect the a segmentation classification output that corresponds to one or more pixels in the reference color image. Using semantic segmentation as the sole substitute for color regularization can also lead to the aforementioned "bleeding" across depth discontinuities within a segmented area, such as when two people at different distances are part of one contiguous segmented area. According to some embodiments, the scenario described above, wherein two people at different distances are part of one contiguous segmented area, may be ameliorated via the use of instance segmentation. In instance segmentation, each separate instance of a person found in the image may be encoded as a separate segmentation class. In such cases, instance segmentation may prevent the regularizer from smoothing over the depth of the entire contiguous segmented area, thereby respecting the differing depths that the two different person instances may be at in the scene.

Semantic Segmentation Combined with Color Regularization

As described above, one of the problems with naively using the segmentation image as a direct replacement for conventional color based regularization is that the background structure from the disparity or depth map is eliminated, which may have contained meaningful and/or aesthetically important information. Thus, according to some embodiments disclosed herein, rather than using the segmentation as a direct replacement, the segmentation information may be used in such a way that respects the semantic meaning of the respective identified segmentation classes in the image.

As mentioned above, in some embodiments, person segmentation may be the type of segmentation applied to a captured image. Therefore, use of such a segmentation should reflect assumptions specifically about people and how depth and/or disparity maps should be with regards to people. For example, it may be reasoned that a person generally consists of relatively uniform depth. E.g., a given person would not consist of depths of both 1 meter and 10 meters from the camera. In other words, the parts of a person's body should be localized within a much smaller depth range. By this reasoning, the segmentation may be used to smooth regions that have been segmented as people, while leaving the pixels that have not been classified as people to use conventional color image regularization. This respects the semantic meaning of the segmentation without using the assumptions about the class (e.g., people, in this example) in areas that were not included as part of the segmentation (e.g., the rest of scene, including the background).

According to some embodiments, this form of combined color and segmentation regularization may be represented by the following equation:

$$\Sigma_{(x,y) \in disparity\ map} |e^{-|\nabla I_{Segmentation}(x,y)|} * \nabla d(x,y) + e^{-|\nabla I_{RGB}(x,y)|} * \nabla d(x,y)|$$ (Eqn. 3), wherein (x,y) represents the pixel coordinates for each pixel that will be used in the disparity regularization operation, $\nabla d(x,y)$ refers to the gradient of the disparity map at the (x,y) pixel coordinates of a given pixel, $\nabla I_{Segmentation}(x,y)$ refers to the gradient of the segmentation mask at the (x,y) pixel coordinates of a given pixel, and $\nabla I_{RGB}(x,y)$ refers to the gradient of the intensity values (e.g., the red/green/blue pixel values) in the reference color image at the (x,y) pixel coordinates of a given pixel. One reason for using the exponential function is that it advantageously provides exponential falloff. For example, if there is a very high gradient in the segmentation mask (i.e., a strong edge in segmentation mask), it is desirable to push the first term in Eqn. 3 above to zero (i.e., if there is a strong edge in the segmentation mask, it is desirable to allow the disparity estimate to change spatially or across the edge, that is, by not strongly penalizing changes in disparity across the edge). Conversely, if the segmentation mask is completely flat, i.e., has a zero gradient, it is desirable to push the first term in Eqn. 3 to one, thereby giving the maximum possible penalty to the optimizer when the gradient in the disparity map, d, is non-zero (i.e., if the gradient in the segmentation mask is small, the gradient in the disparity map should also be small).

As described above, the source of the regularization constraint for a given pixel may vary, e.g., coming from the segmentation mask or coming from the color image. However, another degree of freedom that may be employed is the global strength of the regularization. In traditional optimization frameworks for depth or disparity estimation, a solution is sought that minimizes the residual of the data term plus a regularization term. A global "lambda" scalar value may be multiplied by the data term to encode how important the data term is, i.e., in comparison to the regularization term. For example, a large lambda will favor solutions that follow the data more, even if they are noisy, while a small lambda will favor solutions following the regularization criteria more, e.g., creating smoother depth or disparity maps in the case when the regularization criteria biases the outcome towards smoothness. While traditional methods may use a global lambda (i.e., when lambda is the same for all pixels over the image), according to some embodiments described herein, a lambda-like scalar weighting value that varies per-pixel, i.e., encoding at each pixel how strong the regularization should be, may be employed.

For example, the information obtained from the semantic segmentation operation may be used to inform the optimization process as to how strongly certain parts of the image should be regularized. In embodiments where the segmentation mask reflects the location of people in the image, for example, a greater regularization strength may be used within the areas of a segmented person due to the aforementioned insight that people are typically fairly uniform in depth, as well as the resulting lower risk in smoothing depth and/or disparity estimates with their neighbors within a person's body. By contrast, in such embodiments, a lower regularization strength may be used in the non-person regions, since the segmentation may be less certain about what the non-person regions actually consist of (e.g., grass, sky, dog, cat, etc.), and more caution may be desired when regularizing these areas since the same assumptions regarding largely uniform depths do not necessary apply in such non-person regions.

Using Semantic Segmentation in a Robust Regime

The approaches described above may be expected to work well with ideal, i.e., perfectly-accurate, semantic segmentation masks. However, in practice, even state of the art semantic segmentation CNNs produce some errors and inaccuracies in their classifications of certain pixels. Furthermore, on processing-constrained and/or power-constrained devices, e.g., small or handheld mobile devices, it may be necessary to employ more performant neural networks that consume less processing and/or power resources—but produce potentially less accurate segmentation output. Therefore, it may be desirable to develop processes that utilize segmentation in a robust and error-tolerant fashion, especially if the depth and/or disparity estimation application is expected to produce high quality results across many different real world environments and image capture conditions.

One way to increase robustness to segmentation errors is to use a weighted combination of the segmentation and color image information to determine the regularization at a given pixel, rather than constraining a binary decision to choose either the segmentation or color image exclusively at each pixel. The weight may be chosen by a variety of methods to lend to increased robustness, as described in further detail below.

Choosing the weight that the segmentation information should contribute to the regularization for a given pixel should reflect how much confidence there is in the given pixel's classification. As mentioned above, some semantic segmentation CNNs can be trained to output a confidence map along with the segmentation mask. Such confidence maps may reflect the certainty from the network regarding its prediction of the class of each pixel. Therefore, according to some embodiments, the weight of influence given to the decision of the semantic segmentation may be diminished correspondingly where the confidence in the segmentation is low.

Furthermore, rather than producing discrete class predictions, some semantic segmentation CNNs may be configured to produce continuous probability estimates regarding a pixel's class. For example, with a person segmentation CNN, rather than the output being binary (e.g., '1'=person pixel, '0'=non-person pixel), the network may produce intermediate probability values (e.g., 0.75=75% chance the pixel is part of a person). By leveraging confidence maps and/or continuous probabilities of semantic segmentations, algorithms can behave in a significantly more robust manner, e.g., by relying on the semantic segmentation more only where the segmentation is likelier to be accurate.

Another element of some embodiments of a robust framework for leveraging semantic segmentation information in making depth and/or disparity estimates is to incorporate the segmentation information along with various other sources of depth and/or disparity data (e.g., stereo matching information, focus pixel correspondences, semantic depth priors, other depth sensing hardware or modalities, etc.) and/or various sources of regularization (e.g., color, segmentation, other priors, etc.) to be solved within the context of a joint optimization framework. One example of a semantic depth prior may be knowledge of a segmented person's physical size and, therefore, likely depth, i.e., due to the person's apparent size in the image. While there are also other methods of integrating semantic segmentation information, e.g., such as post-processing disparity or depth maps using segmentation, the inventors have discovered that better quality depth and disparity maps may often be achieved if the various sources of data—including segmentation—are combined into a single loss function to be optimized. This lets the optimizer find a best local minima in a cost space that is formed by all of the inputs to the problem, which is more powerful than using chains of independent blocks, each with limited knowledge and/or purpose. In a joint optimization framework, e.g., all errors from all sources of data are accounted for, thus adding redundancy by taking advantage of combining all known priors (e.g., from data, color, and segmentations) and their respective confidences.

Thus, according to some embodiments, an equation as follows, which incorporates both segmentation confidence weights as well as maximum segmentation influence weights (as will be described in greater detail below), may be used to solve a joint optimization problem:

$$\Sigma_{(x,y)\in disparity\ map}|\omega(x,y)*e^{-|\nabla I_{segmentation}(x,y)|}*\nabla d(x,y)+ (1\omega(x,y))*e^{-|\nabla I_{RGB}(x,y)|}*\nabla d(x,y)| \quad \text{(Eqn. 4)},$$

wherein (x,y) represents the pixel coordinates for each pixel that will be used in the disparity regularization operation, $\nabla d(x,y)$ refers to the gradient of the disparity map at the (x,y) pixel coordinates of a given pixel, $\nabla I_{Segmentation}(x,y)$ refers to the gradient of the segmentation mask at the (x,y) pixel coordinates of a given pixel, $\Delta I_{RGB}(x,y)$ refers to the gradient of the intensity values (e.g., the red/green/blue pixel values) in the reference color image at the (x,y) pixel coordinates of a given pixel, $\omega(x,y)$ refers to the segmentation weight contribution relative to the contribution from the color image.

According to some embodiments, the segmentation weight, w, may be defined as follows:

$$\omega=c*(\Phi_p*s+\Phi_{np}(1-s)) \quad \text{(Eqn. 5)},$$

wherein s is the segmentation value, c is the segmentation confidence value, $\phi_p$ is the maximum segmentation influence allowed for the semantic area (i.e., areas that are considered a part of the segmentation class that the segmentation operation is attempting to find, e.g., pixels with a score of s=1, in the case of a binary segmentation classification algorithm), and $\phi_{np}$ is the maximum segmentation influence allowed for the non-semantic area (i.e., areas that are not considered a part of the segmentation class that the segmentation operation is attempting to find, e.g., pixels with a score of s=0, in the case of a binary segmentation classification algorithm).

In the exemplary embodiments described above that incorporate person segmentation as a prior to disparity estimation, the influence of the segmentation on regularization at that pixel may be represented by $\omega$, as shown in Eqn. 5 above, and the influence of the color image may be represented as:

$$\Omega=1-\omega \quad \text{(Eqn. 6)}.$$

For example, if the maximum segmentation influence is 1 (i.e., $\Phi_p=1$), and if the semantic segmentation is fully confident (i.e., c=1) in its prediction that a pixel has max probability of being a person (i.e., s=1), then the regularization at a pixel is fully determined by segmentation (i.e., the first half of Eqn. 4, above)—and not by the color image. That is to say, in such a scenario, the value of $\omega$ would be 1, and the value of $\Omega$ would be 0.

Since there are different maximum segmentation influences in this example, i.e., $\Phi_p$ and $\Phi_{np}$ for the person and non-person areas, respectively, this gives the algorithm the flexibility to treat these areas differently, such as to project different assumptions regarding how the disparity should be regularized depending on its semantic meaning. For example, in some embodiments, a choice could be made to smooth aggressively within a person because of the aforementioned notion that people are generally constrained to a small depth range, while choosing to fall back to more general, e.g., color image-based, regularization techniques for the non-person areas of the image. This type of robust scheme (e.g., utilizing both confidence values and maximum influence weights) thus respects the semantic meaning of the particular segmentation used and allows for the enforcement of the assumptions on only those areas of the images that are likely to truly be part of their assigned semantic class. It is to be understood that the above-described equations constitute a description of just one particular embodiment of a robust depth and/or disparity estimation framework, and the inventive concepts presented herein are not so limited in their possible implementation.

It is further to be understood that semantic segmentation, as described herein, may serve as a general prior to an optimization framework. In other words, any type of semantic segmentation may be used to improve depth or disparity estimates obtained from arbitrary modalities. It is also noted that the semantic segmentation information used in the methods described herein is used for regularization purposes, and not simply to segment out the regions of the image where additional blurring should not be applied (e.g., during the generation of synthetic SDOF images). Depending on which semantic segmentation is used, different assumptions can be used as priors to guide depth and/or disparity estimations that properly reflect the semantic meaning of different semantic classes. These assumptions may affect the data term and/or the regularization term of an optimization framework.

For example, if a semantic segmentation CNN was used that detected the location of portions of the "sky" in captured images, an appropriate assumption may be that the sky areas are expected to be infinitely far away from the plane of focus of the captured image (i.e., have a huge depth or zero disparity). Such a semantically-appropriate assumption could then be used to bias the data term to the assumed range (or to encourage high regularization within the sky areas).

Objects with holes in them, e.g., fences, may present another opportunity to apply a semantically-appropriate assumption as a prior to an optimization framework. For example, one common error in traditional disparity estimation techniques is to regularize over the holes in objects like fences, especially if the background is of a similar color (e.g., brown wood fence over brownish foliage background), rather than respecting their different depths found via initial disparity estimates. If there was a semantic segmentation that detected fences or objects with holes, the regularization strength could be appropriately relaxed over such detected objects, so that the holes in the fence would not be 'smoothed over' with inaccurate depths, i.e., with all "foreground" depths, in this instance. This is but one example where semantically-appropriate assumptions may be built into a robust framework for depth and/or disparity estimations.

In still other embodiments, multiple, e.g., different, segmentations may be combined together (e.g., with their own segmentation-specific priors/assumptions) within the same image. This would allow a regularizer to, e.g., smooth depth and/or disparity estimates within a person region in an image, while, at the same time, biasing the data term to be at an infinite depth in regions of the image that correspond to the sky. In such multi-segmentation embodiments, it may be desirable to also have multiple different weights for the different segmentations (e.g., one for person, one for sky, etc.). Then, at a given pixel in the image, the regularizer may interpolate between the different segmentations based on which one has a greater confidence score. For example, for a given pixel, it may be classified as 75% likely to be a person, but also 25% likely to be sky pixel. In such instances, the priors/assumptions for the respective segmentations may also be enforced proportionally to the various segmentations' respective confidence values for the given pixel by the regularizer during the optimization process.

Figure 1D:
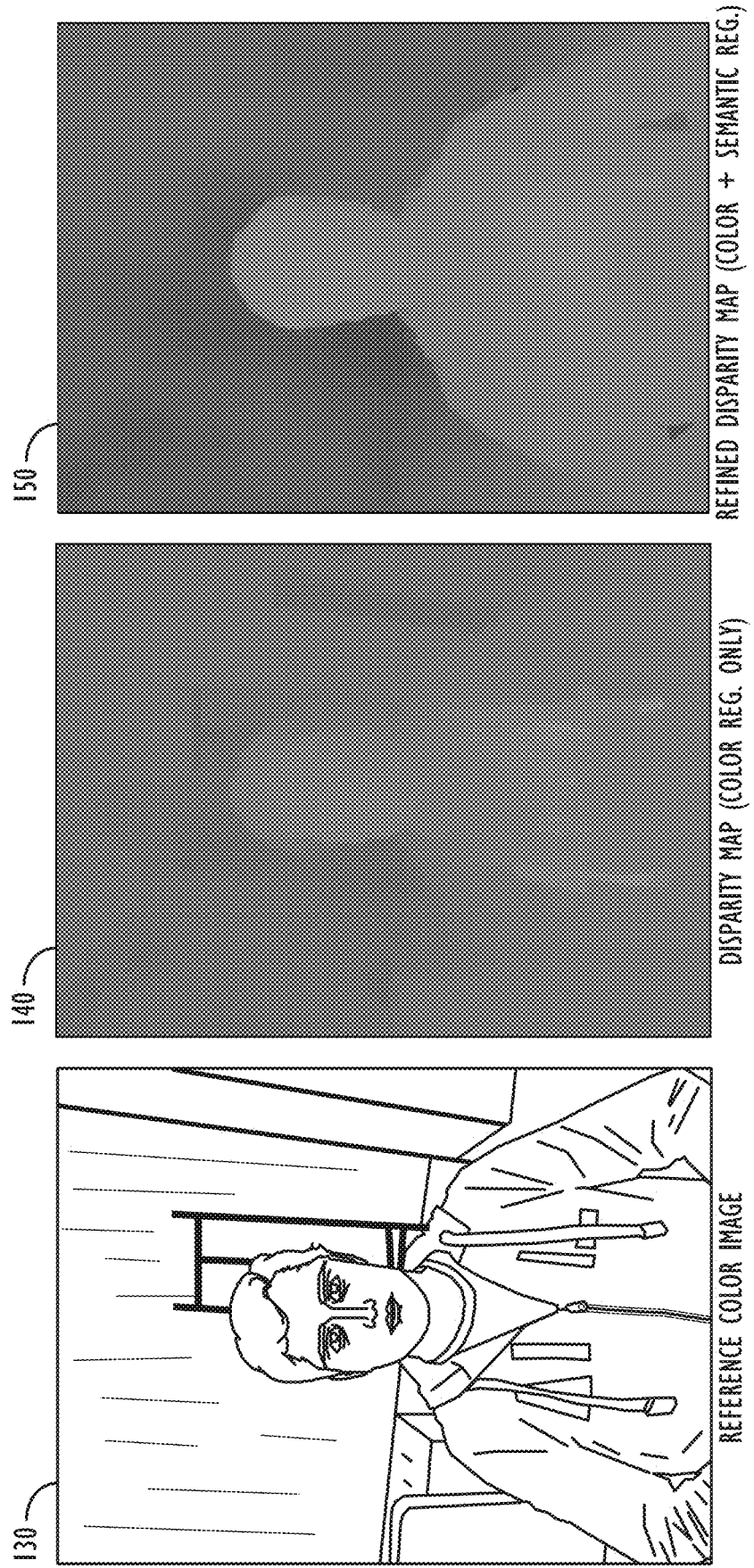
FIG. 1D is an example of a reference color image and the corresponding disparity maps, with and without semantic regularization.

Referring now to FIG. 1D, an example of a reference color image 130, a corresponding disparity map without semantic regularization (140), and a corresponding disparity map with semantic regularization (150) are shown. In this example, the human subject in the foreground of the reference color image 130 is wearing a sweatshirt that largely consists of a color(s) in common with color(s) found in large portions of the scene background. As illustrated in FIG. 1D, the disparity map with semantic regularization (150) does a better job of placing the entire human subject in the foreground of the scene (i.e., represented by the lighter pixels in the shape corresponding to the human subject) than does the disparity map without semantic regularization (140), which relied on color regularization only, and thus would place large portions of the human subject at the same (or similar) depth to the majority of the background of the scene. Thus, disparity map 150 presents one concrete example of the benefits of the robust depth estimation techniques described herein.

Generally speaking, as human subjects (or whatever the subject of interest is in a given image) get farther away from the camera, and as light levels decrease, the data term in an optimization becomes much weaker and noisier (e.g., in cases where the data term comes from stereo information and/or focus pixels). When the data term is weaker and noisier, having a robust regularization scheme (as opposed to simple color regularization alone, for example) becomes even more important, i.e., due to the unreliability of the data term in such situations. While the data terms from stereo information and focus pixels become weaker as subjects move farther from the camera and/or as light levels decrease, other sources of data may not. However, such other sources of depth data could also be very reliant on regularization, e.g., due to only being able to deliver data at sparse locations in the frame. Robust regularization would then become important in such situations, as well, e.g., to "spread" or propagate the sparsely sampled information correctly.

Exemplary Process Overview

Figure 2:
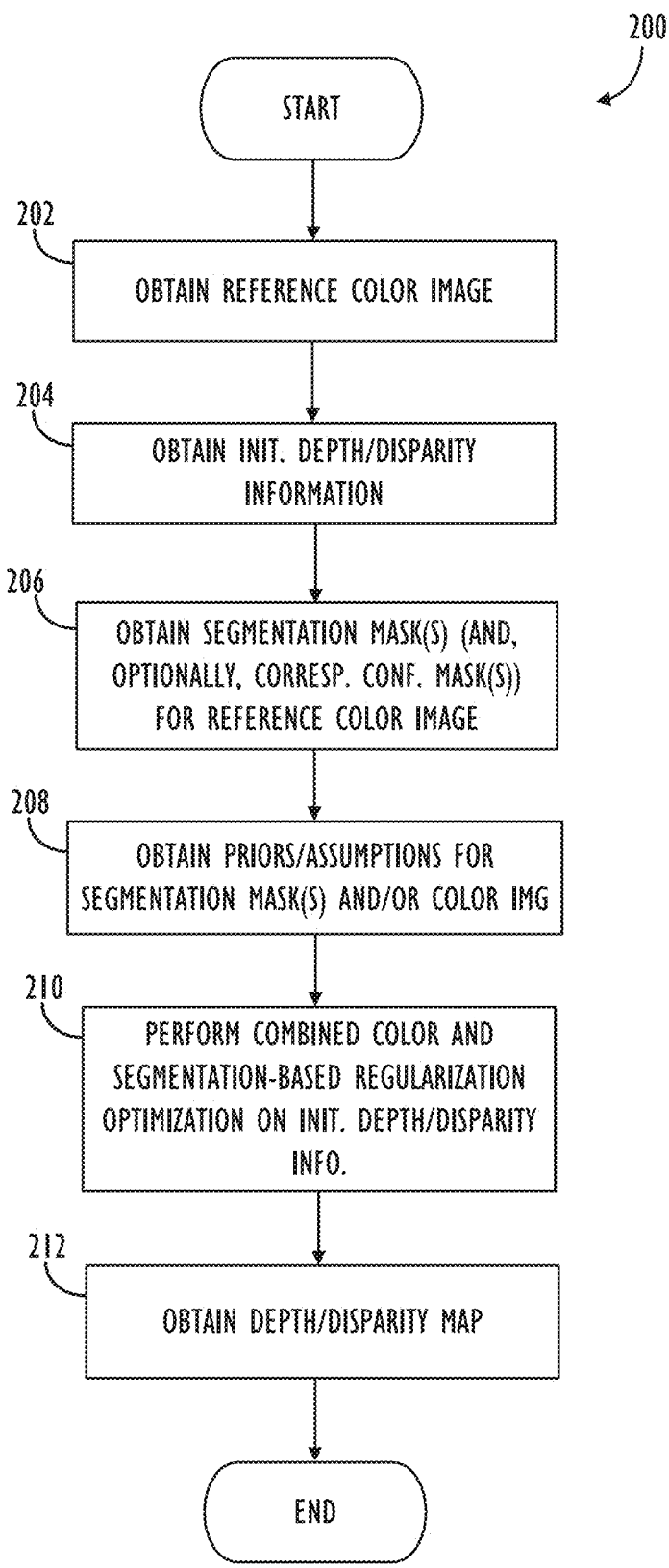
FIG. 2 is an exemplary method for generating robust depth and/or disparity estimations, according to one or more embodiments.

Turning now to FIG. 2, an exemplary method 200 for generating robust depth and/or disparity estimations is shown, according to one or more embodiments described above. First, the method 200 may begin by obtaining a reference color image (Step 202). Next, initial depth and/or disparity information may be obtained, e.g., from any desired depth or disparity estimation modality (Step 204). Next, the process may obtain one or more segmentation masks for the reference color image and, optionally, the corresponding confidence masks for one or more of the segmentation masks (Step 206). As discussed above, the segmentations may be binary, multi-class, or even continuous. The segmentations masks and confidence masks may be produced by a neural network or other machine learning-based system. The confidence masks may reflect the confidence that the given neural network or other machine learning-based system has in its segment classification of any given pixel in the reference color image.

Next, the method 200 may obtain the desired priors/assumptions for the segmentation masks and reference color image (Step 208). As described above, in some embodiments, the segmentation assumptions may be tailored or particularized to the particular class of object that they will be used on. For example, a regularizer can make different assumptions about the depth of a person in a scene than it can about a sky, or Sun, or wall in a scene. Next, the method 200 may perform a combined color and segmentation-based regularization optimization process (Step 210) on the obtained initial depth and/or disparity information to generate a first depth or disparity map corresponding to the obtained color image, e.g., in accordance with the various embodiments described above (Step 212). As mentioned above, the generated disparity and/or depth maps may be utilized in various photography applications, such as the generation of synthetic portrait-style SDOF images.

Exemplary System Overview

Figure 3:
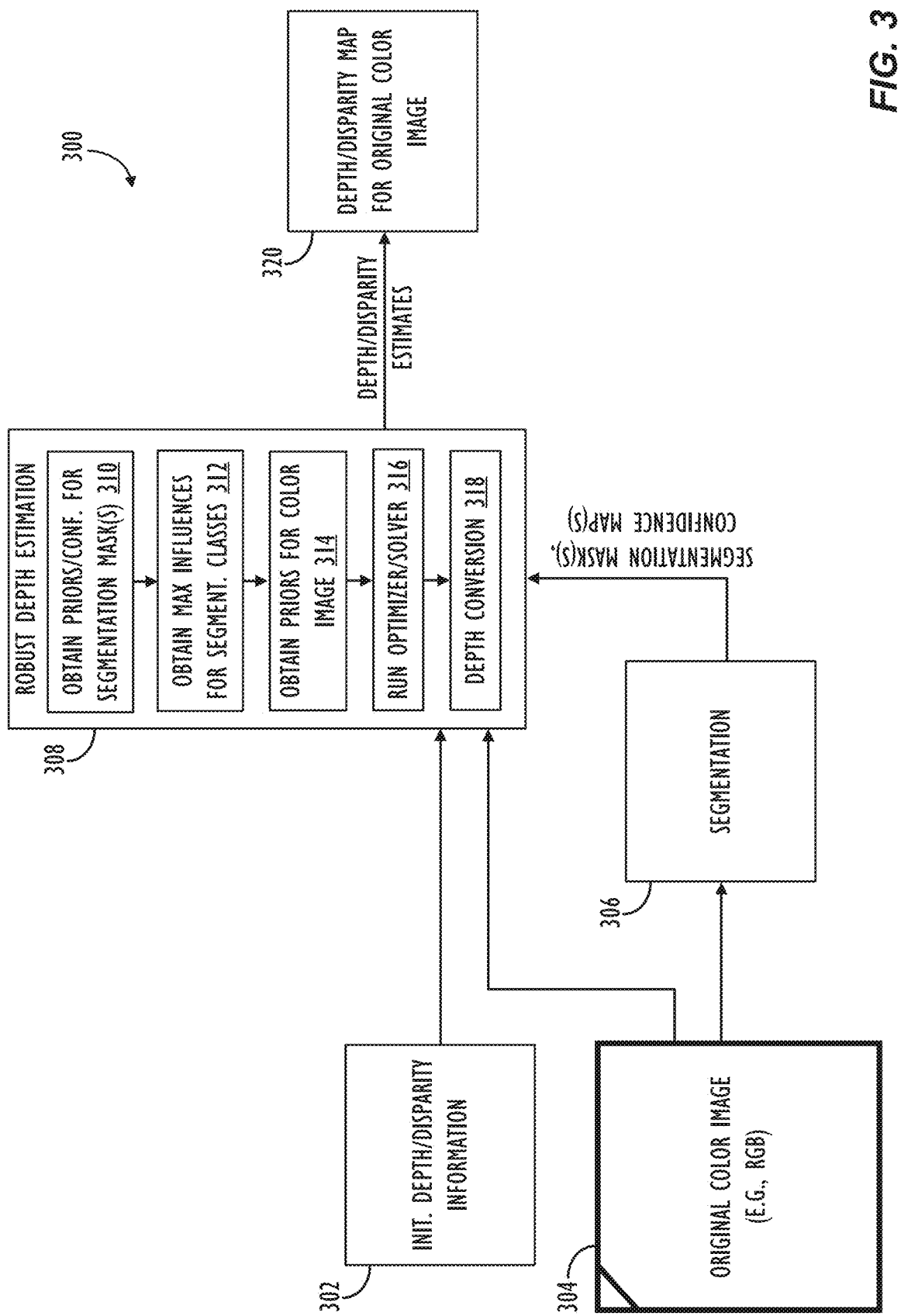
FIG. 3 is a block diagram of a system for generating robust depth and/or disparity estimations, according to one or more embodiments.

Turning now to FIG. 3, a block diagram of a system 300 for generating robust depth and/or disparity estimations is shown, according to one or more embodiments. Beginning at the left-hand side of FIG. 3, an original color image (e.g., in RGB format) 304 may be obtained by the system. In conjunction with the original color image 304, initial depth and/or disparity information 302 may be obtained from a desired modality, e.g., in the form of a set of focus pixel disparity estimates distributed over the captured scene. Further, segmentation operation 306 may be performed upon the original color image 304, resulting in any number of desired segmentation masks, any number of which segmentation masks may have corresponding confidence masks. As mentioned above, each such segmentation mask produced over the original color image may have as many classes as is desired.

Each of the sources of information, i.e.: initial depth and/or disparity information (302), the original color image data (304), and the segmentation information (306) may then be fed into the robust depth/disparity estimation process 308. As described above, the robust depth/disparity estimation process 308 may: obtain priors/assumptions for the various segmentations masks (as well as their corresponding confidence masks, if provided) (Step 310); obtain a maximum influence value for one or more of the segmentation classes of one or more of the segmentation masks (Step 312); obtain any priors/assumption for the color image (Step 314); and then run the joint optimization process (Step 316), e.g., in the form of an iterative solver operation. The result of the joint optimization process will then be a regularized depth or disparity map that has taken into account both color information and specific priors/assumptions based on the semantic meanings of the various segmentation classes appearing in the image. If the optimizer has been run on disparity values, and if so desired, the regularized disparity map values may be converted into depth estimates by any desired method (318). The output of the joint optimization process will thus be an improved depth or disparity map for the original color image (320), which may, as mentioned above, be utilized in various photography applications, such as the generation of synthetic portrait-style SDOF images. In some embodiments, conversion of a regularized disparity map's values into depth estimates and/or a depth map may not be necessary, as certain photography applications, such as the aforementioned portrait-style SDOF image rendering, may be able to operate directly on disparity information, i.e., without being converted explicitly into depth estimates.

Exemplary Electronic Device

Figure 4:
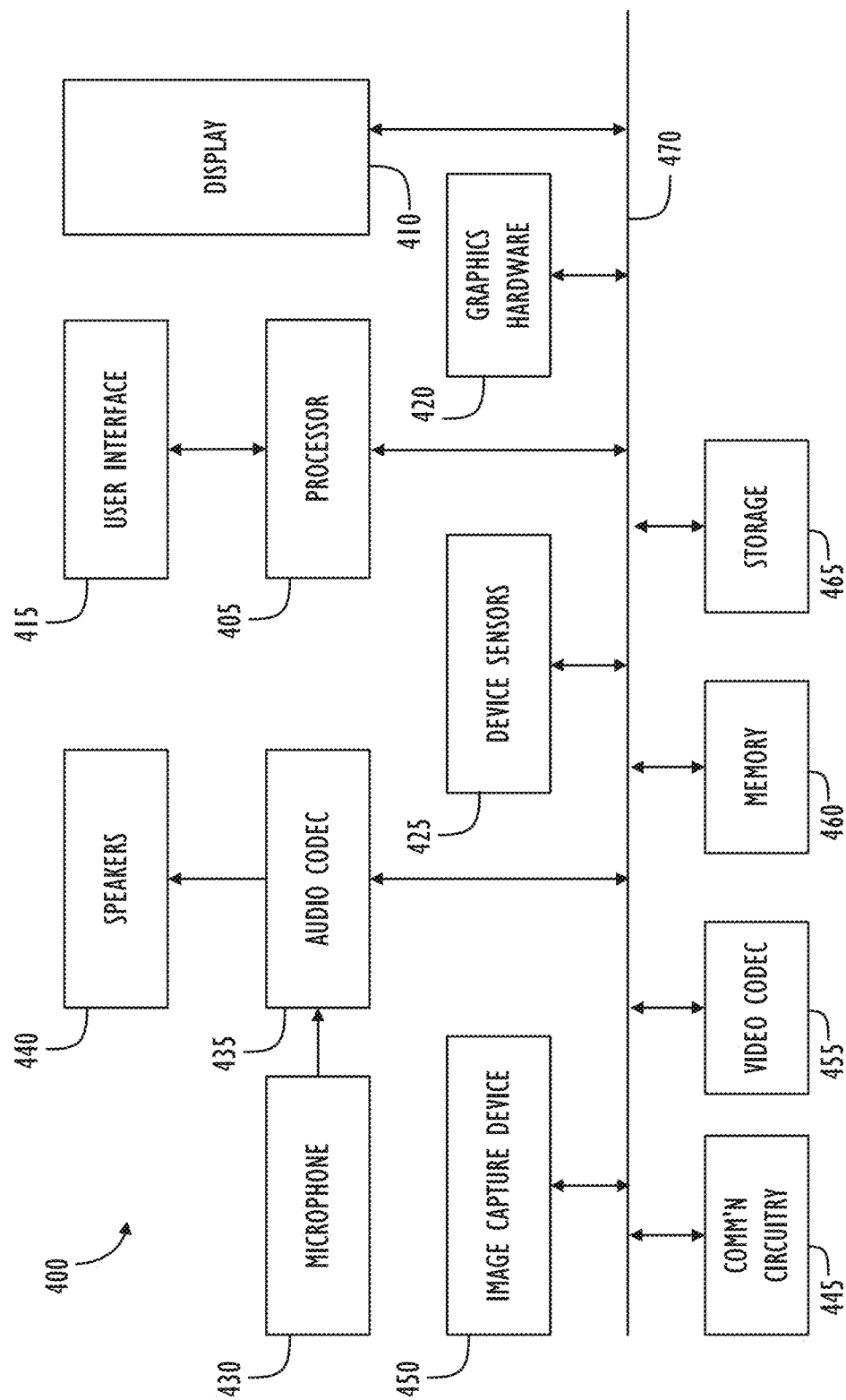
FIG. 4 is a block diagram illustrating an exemplary electronic device, in which one or more of the techniques disclosed herein may be implemented.

Referring now to FIG. 4, a simplified functional block diagram of illustrative programmable electronic device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture device 450, which may, e.g., comprise multiple camera units/optical image sensors having different characteristics or abilities (e.g., High Dynamic Range (HDR), Optical Image Stabilization (OIS) systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of disparity/depth information in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture device 450 may comprise one or more camera units configured to capture images, e.g., images which may be processed to generate depth/disparity information for such captured images, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein.

It is to be understood that the above description is intended to be illustrative, and not restrictive. For example, the use of semantic segmentation to inform depth algorithms and improve their quality as described in this disclosure can be used with multiple sensor modalities and is not dependent on the specific sensing or hardware involved. Applications include, but are not limited, to disparity computed from a traditional stereo image pair, disparity computed from focus pixels (i.e., pixels used for phase detection autofocus), and depth acquired via active sensing. Also, in this disclosure, both depth and disparity estimation are referred to. It is to be understood that, broadly speaking, disparity may be viewed as inversely proportional to depth.

Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device comprising instructions stored thereon to cause one or more processors to:
   obtain a first image of a scene, the first image comprising a first plurality of pixels, the pixels having color values;
   obtain first depth or disparity information comprising a first plurality of values, wherein each value corresponds to a location in the scene;
   obtain at least one semantic segmentation mask comprising a first plurality of segmentation values, wherein each segmentation value corresponds to a location in the scene;
   obtain at least one regularization term for at least one of the at least one semantic segmentation masks; and
   perform an optimization operation to generate a first depth or disparity map,
   wherein the optimization operation jointly minimizes an equation that is based on the color values of the first plurality of pixels, the first depth or disparity information, the at least one semantic segmentation mask, and the at least one regularization term.

2. The non-transitory program storage device of claim 1, wherein the instructions further cause the one or more processors to: generate a blurred version of the first image based, at least in part, on the generated first depth or disparity map.

3. The non-transitory program storage device of claim 1, wherein the optimization operation is further based on jointly minimizing an equation that is based on: a gradient of the color values of the first plurality of pixels; a gradient of the first plurality of values of the first depth or disparity information; and a gradient of the first plurality of segmentation values of the at least one semantic segmentation mask.

4. The non-transitory program storage device of claim 1, wherein the instructions further cause the one or more processors to: obtain a confidence mask for one of the at least one obtained semantic segmentation masks, wherein the optimization operation is further based, at least in part, on the obtained confidence mask.

5. The non-transitory program storage device of claim 1, wherein the instructions further cause the one or more processors to: obtain a maximum influence value for at least one of the at least one semantic segmentation masks, wherein the optimization operation is further based, at least in part, on the obtained maximum influence value.

6. The non-transitory program storage device of claim 1, wherein the at least one semantic segmentation mask comprises at least two semantic segmentation masks, wherein the instructions further cause the one or more processors to obtain at least one regularization term for each of the at least two semantic segmentation masks, and wherein the optimization operation is further based, at least in part, on the obtained regularization term for each of the at least two semantic segmentation masks.

7. The non-transitory program storage device of claim 6, wherein the instructions further cause the one or more processors to: obtain a maximum influence value for each of the at least two semantic segmentation masks, wherein the optimization operation is further based, at least in part, on the obtained maximum influence value for each of the at least two semantic segmentation masks.

8. The non-transitory program storage device of claim 1, wherein at least one value of the first plurality of values corresponds to a location of a focus pixel of an image capture device used to capture the first image.

9. The non-transitory program storage device of claim 1, wherein at least one of the at least one regularization term enforces a smoothness constraint.

10. An electronic device, comprising:
    a memory;
    one or more image capture devices;
    a display;
    a user interface; and
    one or more processors operatively coupled to the memory, wherein the one or more processors are configured to execute instructions causing the one or more processors to:
      obtain a first image of a scene from the one or more image capture devices, the first image comprising a first plurality of pixels, the pixels having color values;
      obtain first depth or disparity information comprising a first plurality of values, wherein each value corresponds to a location in the scene;
      obtain at least one semantic segmentation mask comprising a first plurality of segmentation values, wherein each segmentation value corresponds to a location in the scene;
      obtain at least one regularization term for at least one of the at least one semantic segmentation masks; and
      perform an optimization operation to generate a first depth or disparity map,
      wherein the optimization operation jointly minimizes an equation that is based on the color values of the first plurality of pixels, the first depth or disparity information, the at least one semantic segmentation mask, and the at least one regularization term.

11. The electronic device of claim 10, wherein the instructions further cause the one or more processors to: generate a blurred version of the first image based, at least in part, on the generated first depth or disparity map.

12. The electronic device of claim 10, wherein the optimization operation is further based on jointly minimizing an equation that is based on: a gradient of the color values of the first plurality of pixels; a gradient of the first plurality of values of the first depth or disparity information; and a gradient of the first plurality of segmentation values of the at least one semantic segmentation mask.

13. The electronic device of claim 10, wherein the instructions further cause the one or more processors to: obtain a confidence mask for one of the at least one obtained semantic segmentation masks, wherein the optimization operation is further based, at least in part, on the obtained confidence mask.

14. The electronic device of claim 10, wherein the instructions further cause the one or more processors to: obtain a maximum influence value for at least one of the at least one semantic segmentation masks, wherein the optimization operation is further based, at least in part, on the obtained maximum influence value.

15. The electronic device of claim 10, wherein the at least one semantic segmentation mask comprises at least two semantic segmentation masks, wherein the instructions further cause the one or more processors to obtain at least one regularization term for each of the at least two semantic segmentation masks, and wherein the optimization operation is further based, at least in part, on the obtained regularization term for each of the at least two semantic segmentation masks.

16. The electronic device of claim 15, wherein the instructions further cause the one or more processors to: obtain a maximum influence value for each of the at least two semantic segmentation masks, wherein the optimization operation is further based, at least in part, on the obtained maximum influence value for each of the at least two semantic segmentation masks.

17. The electronic device of claim 10, wherein at least one value of the plurality of values corresponds to a location of a focus pixel of one of the one or more image capture devices used to capture the first image.

18. The electronic device of claim 10, wherein at least one of the at least one regularization term enforces a smoothness constraint.

19. An image processing method, comprising:
  obtaining a first image of a scene from one or more image capture devices, the first image comprising a first plurality of pixels, the pixels having color values;
  obtaining first depth or disparity information comprising a first plurality of values, wherein each value corresponds to a location in the scene;
  obtaining at least one semantic segmentation mask comprising a first plurality of segmentation values, wherein each segmentation value corresponds to a location in the scene;
  obtaining at least one regularization term for at least one of the at least one semantic segmentation masks; and
  performing an optimization operation to generate a first depth or disparity map,
  wherein the optimization operation jointly minimizes an equation that is based on the color values of the first plurality of pixels, the first depth or disparity information, the at least one semantic segmentation mask, and the at least one regularization term.

20. The method of claim 19, further comprising generating a blurred version of the first image based, at least in part, on the generated first depth or disparity map.

21. The method of claim 19, wherein the optimization operation is further based on jointly minimizing an equation that is based on: a gradient of the color values of the first plurality of pixels; a gradient of the first plurality of values of the first depth or disparity information; and a gradient of the first plurality of segmentation values of the at least one semantic segmentation mask.

22. The method of claim 19, further comprising obtaining a confidence mask for one of the at least one obtained semantic segmentation masks, wherein the optimization operation is further based, at least in part, on the obtained confidence mask.

23. The method of claim 19, further comprising obtaining a maximum influence value for at least one of the at least one semantic segmentation masks, wherein the optimization operation is further based, at least in part, on the obtained maximum influence value.

24. The method of claim 19, wherein the at least one semantic segmentation mask comprises at least two semantic segmentation masks, wherein the method further comprises obtaining at least one regularization term for each of the at least two semantic segmentation masks, and wherein the optimization operation is further based, at least in part, on the obtained regularization term for each of the at least two semantic segmentation masks.

25. The method of claim 24, further comprising obtaining a maximum influence value for each of the at least two semantic segmentation masks, wherein the optimization operation is further based, at least in part, on the obtained maximum influence value for each of the at least two semantic segmentation masks.

26. The method of claim 19, wherein at least one value of the plurality of values corresponds to a location of a focus pixel of one of the one or more image capture devices used to capture the first image.

27. The method of claim 19, wherein at least one of the at least one regularization term enforces a smoothness constraint.

* * * * *